United States Patent
Di Gregorio et al.

(10) Patent No.: US 7,328,329 B2
(45) Date of Patent: Feb. 5, 2008

(54) CONTROLLING PROCESSING OF DATA STREAM ELEMENTS USING A SET OF SPECIFIC FUNCTION UNITS

(75) Inventors: Lorenzo Di Gregorio, Pescara (IT); Xiaoning Nie, München (DE); Thomas Wahl, Fulda (DE)

(73) Assignee: Infineon Technologies AG, Munich (DE)

( * ) Notice: Subject to any disclaimer, the term of this patent is extended or adjusted under 35 U.S.C. 154(b) by 359 days.

(21) Appl. No.: 10/719,794

(22) Filed: Nov. 21, 2003

(65) Prior Publication Data

US 2004/0139436 A1 Jul. 15, 2004

(30) Foreign Application Priority Data

Nov. 22, 2002 (DE) ............................... 102 54 653

(51) Int. Cl.
*G06F 9/40* (2006.01)

(52) U.S. Cl. .................. 712/214; 712/205; 712/229; 712/241; 718/102

(58) Field of Classification Search ............. 712/214, 712/229, 241, 228, 205, 206; 718/102, 108
See application file for complete search history.

(56) References Cited

U.S. PATENT DOCUMENTS

| | | | | |
|---|---|---|---|---|
| 3,418,638 A | * | 12/1968 | Tomasulo et al. | ............ 712/233 |
| 5,483,552 A | * | 1/1996 | Shimazaki et al. | ......... 375/233 |
| 5,721,865 A | * | 2/1998 | Shintani et al. | ............. 711/137 |
| 5,974,538 A | | 10/1999 | Wilmot, II | .................. 712/218 |
| 7,047,399 B2 | * | 5/2006 | Sturges et al. | .............. 712/235 |
| 2002/0069393 A1 | | 6/2002 | Cismas | ......................... 716/1 |
| 2004/0075747 A1 | * | 4/2004 | Silverbrook | ........... 348/207.99 |

* cited by examiner

*Primary Examiner*—Tonia L. Meonske
(74) *Attorney, Agent, or Firm*—Slater & Matsil, L.L.P.

(57) ABSTRACT

A device (1) to control processing of data elements (data_i), in which a thread is assigned to each data element (data_i), comprises a first unit (CS), which, during a first cycle, fetches an instruction (cs_ir_s) that is entered in the context of the thread assigned to the incoming data element (data_i), a second unit (IF), which, during a second cycle, fetches an instruction (if_ir_s) that succeeds a stipulated instruction in a stipulated thread, and a third unit (ID), which, during the second cycle, decodes the instruction prescribed for processing of the data element (data_i) and generates a data element processing signal (dec_o).

33 Claims, 1 Drawing Sheet

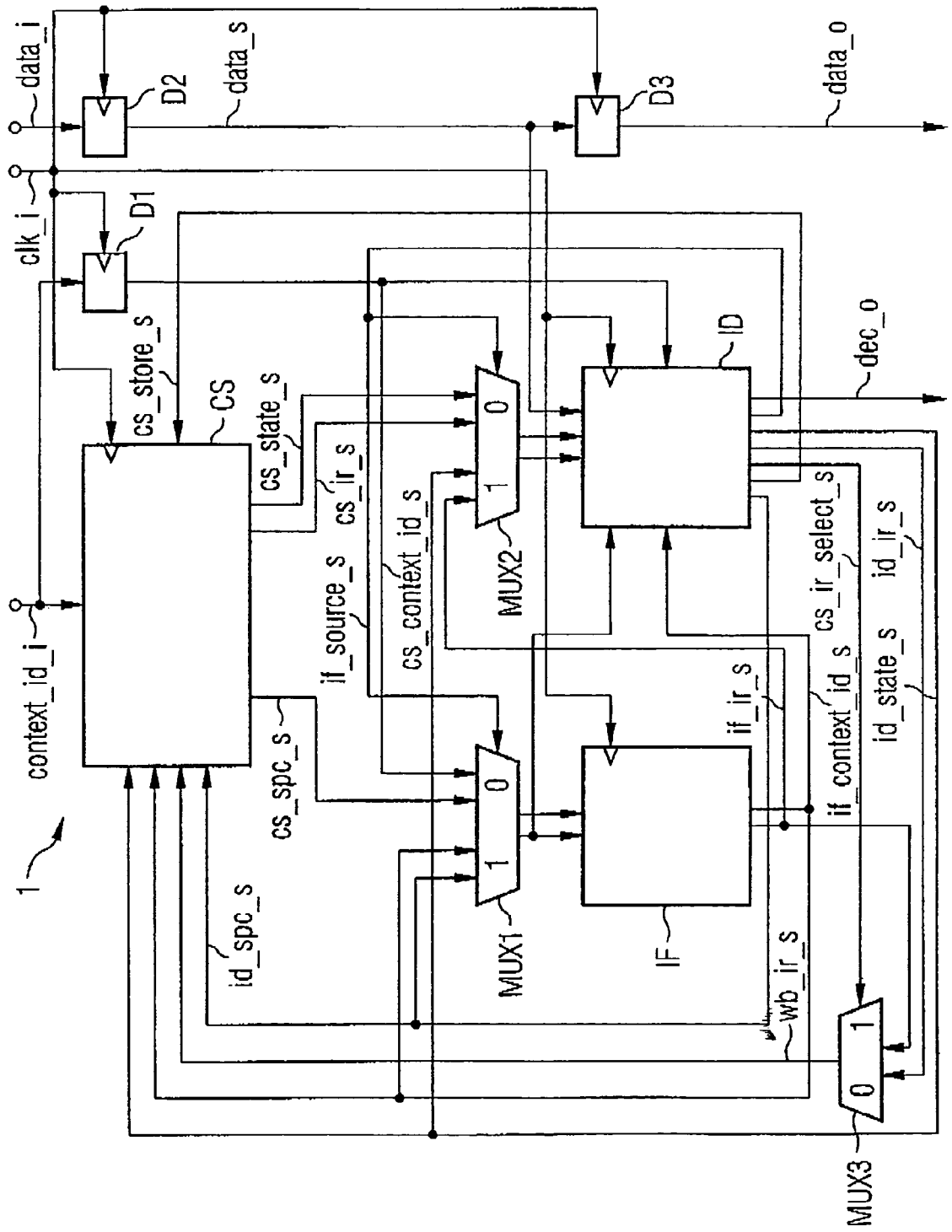

CONTROLLING PROCESSING OF DATA STREAM ELEMENTS USING A SET OF SPECIFIC FUNCTION UNITS

PRIORITY

This application claims foreign priority of the German application DE 10254653.3 filed on Nov. 22, 2002.

TECHNICAL FIELD OF THE INVENTION

The invention concerns a device laid out to control processing of elements of a data stream.

BACKGROUND OF THE INVENTION

Data streams, containing data elements that originate from different data sources, are frequently transmitted in data nets. The data elements of the different data sources are then arranged sequentially in a data stream. The data elements are sent to processing in the sequence in which they are present in the data stream.

During processing of the data elements, execution of very simple, lightweight instructions can be involved. A stipulated sequence of such instructions is referred to as a thread. During processing of the data elements of a data stream, different threads are generally processed. Which thread is processed at which time generally depends on the properties of the data element that is foremost on the data stream at this time. The choice of thread depends, in particular, on the data source, from which the data element to be processed originates. For this purpose, data elements are often provided with an identification number that characterizes their corresponding data source. The allocated thread can be identified by means of this identification number.

Each thread is assigned its own context. The context contains information concerning the state, in which processing of the thread at the present time is situated. Before the beginning of execution of a thread, the first instruction to be executed in the thread can be entered in the registers allocated to the context. After the beginning of execution of the thread, these registers can be overwritten with the actual instructions of the thread.

A device that assigns the instruction from the corresponding thread, prescribed for an incoming data element, and decodes this instruction is necessary for processing of data elements, so that a component connected after this device, which carries out actual processing of the data element, can be supplied control signals for processing.

Ordinary devices that fulfill the purpose just mentioned are based either on software solutions that run on a digital signal processor, or on hardware solutions. However, software solutions are rather inefficient for byte-byte-processing. Hardware solutions have the drawback of limited flexibility with respect to protocol changes.

SUMMARY OF THE INVENTION

The task of the invention is to devise an apparatus for controlling processing of data elements of a data stream that has high efficiency and high flexibility.

The task underlying the invention can be solved by a device for controlling processing of data elements, in which a thread is assigned to each data element and no more than one data element enters the device at one time, comprising a first unit, in which the context for each thread is entered, and which fetches an instruction during a first clock cycle that is entered in the context of the thread assigned to the incoming data element, a second unit, which, during a second clock cycle, fetches an instruction, which succeeds a stipulated instruction in the sequence of instructions of a stipulated thread, and a third unit, which, during the second clock cycle, decodes the instruction that is provided for processing of the data element and fetches a control signal for processing of the data element.

The object can also be achieved by a method for controlling processing of data elements, comprising the steps of:
assigning a thread to each data element and no more than one data element enters the device at one time,
fetching an instruction in a first unit during a first clock cycle that is entered in the context of the thread assigned to the incoming data element,
fetching an instruction in a second unit, which succeeds a stipulated instruction in the sequence of instructions of a stipulated thread, and
decoding the instruction that is provided for processing of the data element and fetching a control signal for processing of the data element in a third unit.

The instruction fetched by the second unit can be the instruction, whose position in the sequence of instructions of the stipulated thread, is the increment of the position of the stipulated instruction. The second unit can be fed with the increment of a count value and an identification value, which designates a thread, and the second unit, by means of the increment and the identification value, may determine the instruction which assumes in the thread designated by the identification value the position designated by the increment assumes. The first unit may activate the context of the thread assigned to the incoming data element, if the preceding data element refers to another thread. The first unit may fetch an instruction of the thread stated in the activated context and transmit this instruction, which is the first instruction of the thread, in particular, to the third unit for decoding, and the first unit may transmit the increment of the position that the instruction fetched by it assumes in the thread, to the second unit. The second unit may determine the instruction that succeeds the instruction fetched by the first unit in the thread. For data elements entering the device in succession, the same thread can be assigned, as long as the same instruction is used, until a stipulated condition is met. Repetition of an instruction can be accomplished by the fetching of the same control signal by the third unit. The number of repetitions of an instruction can be stipulated by a value, this value, during a repetition of the instruction, can be decremented by the third unit, and the repetitions can be interrupted at the value 0. After fulfillment of the stipulated condition for processing of the data element entering the device next, a stipulated instruction within the thread can be used, if the same thread is assigned to this data element. The inquiry into fulfillment of the stipulated condition may occur in the third unit. The stipulated instruction can be the instruction fetched by the second unit. A connection line for data transmission between the second unit and the third unit can be provided, through which the instruction, fetched by the second unit is transmitted to the third unit. The instruction fetched by the second unit can be transmitted to the first unit and entered in the context there. The stipulated instruction can be fetched by the first unit and transmitted to the third unit for decoding. The third unit, after fulfillment of the stipulated condition, can transmit an instruction to the first unit as to which instruction is to be fetched. The stipulated condition, whose fulfillment leads to interruption of repetitions of an instruction, can be fulfilled by a signal controllable from outside of device, or by a specific data element entering the device, or by a specific state of the corresponding thread, or by a specific instruction to be processed. A program memory can be provided, in which the instructions for processing of the data elements are entered, and in which information is entered for each instruction on how many data elements the instruction is to be applied, wherein the program memory has program lines, in particular, in which one instruction and the corresponding information, with reference to the number of repetitions, are entered. Two series-connected delay units can be provided that delay the data element by one clock cycle each.

The device according to the invention is used to control processing of data elements and includes a first unit, a second unit and a third unit. In the device according to the invention, no more than one data element enters at a time. A thread is assigned to each data element.

The context for each thread is entered in the first unit. During a first clock cycle, an instruction is fetched from the first unit, which is entered in the context of the thread assigned to the incoming data element.

The second element fetches an instruction during a second clock cycle that succeeds a stipulated instruction in the sequence of the instructions of a stipulated thread.

The third unit decodes the instruction during the second clock cycle, which is prescribed for processing of the data element, and generates a control signal for processing of the data element.

The instruction prescribed for processing of the data element can be fed from the first or second unit to the third unit in a preceding clock cycle. This instruction can also be determined by means of a stipulated sequence of instructions or based on a condition algorithm.

The control signal generated by the third unit can be conveyed, together with the data element, to a component connected after the device according to the invention, so that actual processing of the data element can be performed in the downline component.

The device according to the invention permits control of data element processing in a much more efficient manner than it is possible with a digital signal processor. The device according to the invention also has a high degree of flexibility, since many parameters that contribute to operation of the device can be stipulated.

The device according to the invention operates according to the principle of a data flow machine (data driven). This means that the device according to the invention only continues processing if a new data element enters the device. In contrast to a data flow machine, a Von Neumann machine operates sequentially with each clock cycle. This is independent of whether a new data element is present or not.

The device according to the invention is laid out so that the instruction required for processing of a data element is always present. This is also the case when a new context must be activated, because of a thread change. The device according to the invention therefore makes possible processing of the incoming data elements with avoidance of data congestion (bubble-free). This feature is not exhibited by the known multi-reading machines.

The instruction fetched by the second unit is preferably the instruction that immediately succeeds the stipulated instruction in the stipulated thread.

For the aforementioned purpose, the second element is advantageously supplied with the increment of a count value and an identification value that designates a thread. By means of the increment and identification value, the second unit determines the instruction that assumes the position designated by the increment in the thread designated by the identification value.

This method of operation of the second unit has the advantage that the instruction that succeeds the instruction just used in the corresponding thread is always fetched by it. Should this instruction be required in the subsequent clock cycle, it is available without delay.

According to an advantageous embodiment of the invention, the context of the thread, which is assigned to the data element entering the device, is activated by the first unit, if the preceding data element referred to another thread.

In this case, the first unit preferably fetches an instruction of the thread stated in the activated context. This instruction, which can be the first instruction of the thread, in particular, is conveyed to the third unit for decoding. The increment of the position that the instruction fetched by it assumes in the thread is sent to the second unit from the first unit.

The second unit advantageously determines the instruction, by means of the obtained increment, that immediately succeeds the instruction fetched by the first unit in the thread.

A particularly preferred embodiment of the invention proposes that, for data elements entering the device in succession, the same thread is assigned, as long as the same instruction is used, until a stipulated condition is met.

During repetition of an instruction, the same control signal can always be generated in a third unit.

In addition, the number of repetitions of an instruction can advantageously be stipulated by a value. This value is decremented during each repetition of the instruction by the third unit. As soon as the value equals zero, the repetitions are interrupted.

Another particularly preferred embodiment of the invention is characterized by the fact that, after fulfillment of the stipulated condition for processing of the data element entering the device next, a stipulated instruction within the thread is used, if the already activated thread is assigned to this data element.

In this case, inquiry into fulfillment of the stipulated condition preferably occurs in the third unit.

The stipulated instruction, to which a jump is made after fulfillment of the stipulated condition, for example, can be the instruction fetched by the second unit.

By a connection line for data transmission between the second unit and the third unit, the instruction fetched by the second unit can preferably be transmitted without delays to the third unit.

It can also be prescribed that the instruction fetched by the second unit is also conveyed to the first unit and entered there in the context.

As an alternative to the instruction fetched by the second unit, after fulfillment of the stipulated condition, a jump can be made to an instruction that is entered in the first unit. This is then conveyed to the third unit for decoding.

In order to select an instruction from the first unit, after fulfillment of the stipulated condition, an instruction is preferably sent to the first unit by the third unit, which states which instruction is to be fetched.

The stipulated condition, whose fulfillment leads to interruption of repetitions of the instruction, can be fulfilled, for example, by a controllable signal from outside of the device, or by a specific data element entering the device, or by a specific state of the corresponding thread, or by a specific instruction being processed.

Another advantageous embodiment of the invention is characterized by a program memory, in which the instructions for processing of the data elements are entered. In addition, information about how many data elements the corresponding instructions are to be applied to is also entered in the program memory for each instruction. The program memory can be arranged in one of the three units of the device according to the invention. In particular, the program memory can have program lines, in each of which an instruction and the corresponding information with reference to the repetition number are entered.

The device according to the invention advantageously comprises two series-connected delay units that delay the data element by one clock cycle. Since the device requires two clock cycles, in order to generate the control signal for processing of the data element, it is guaranteed by the two delay units that the data element and the control signal reach the downline components simultaneously in the device.

BRIEF DESCRIPTION OF THE DRAWINGS

The invention is further explained below with reference to the drawing. The drawing shows the single FIGURE of a schematic of a practical example of the device according to the invention.

DETAILED DESCRIPTION OF THE PREFERRED EMBODIMENTS

A device 1 is shown in the FIGURE, which has a contact switch unit CS (context switch), an instruction fetch unit IF (instruction fetch), an instruction decoding unit ID (instruction decoding), delay elements D1, D2 and D3, as well as multiplexers MUX1, MUX2 and MUX3.

The components just mentioned of device 1 each have inputs and outputs for communication with the other components and for control. These inputs and outputs are described below.

The context switching unit CS has inputs for a context identification value context_id_i, a state word id_state_s, a context identification word if_context_id_s, an instruction set data element wb_ir_s, a speculative count value id_sp_s and a control signal cs_store_s. On the output side, the context switching unit CS issues a speculative counting value cs_spc_s, an instruction set data element cs_ir_s and a state element cs_state_s.

The instruction fetch unit IF has two input connections to the outputs of the multiplexer MUX1. At its outputs, the instruction fetch unit IF issues an instruction set data element if_ir_s and a context identification value if_context_id_s.

The instruction decoding unit ID has two input connections to the outputs of the multiplexer MUX2 and an input connection to an output of the multiplexer MUX1 and the output of the delay element D2. The context identification values if_context_id_s and cs_context_id_s, as well as a useful data element data_s, also supply the instruction decoding unit ID. At its outputs, the instruction decoding unit ID issues the speculative counting value id_spc_s, the control signal cs_store_s, a control signal cs_ir_select_s, an instruction set data element id_ir_s, the state element id_state_s, the control signal if_source_s and a control signal dec_o.

The lines for the speculative counting value id_spc_s, the context identification value if_context_id_s, the speculative counting value cs_spc_s and the context identification value cs_context_id_s are connected to the inputs of multiplexer MUX1. A control input of multiplexer MUX1 is provided with the control signal if_source_s.

Lines for the instruction set data element if_ir_s, the state word id_state_s, the instruction set data element cs_ir_s and the state element cs_state_s are connected to the inputs of multiplexer MUX2. A control input of the multiplexer MUX2 is provided with the control signal if_source_s.

The multiplexer MUX3 is fed on the input side by the instruction set data elements if_ir_s and id_ir_s and issues on the output side the instruction set data element wb_ir_s. The multiplexer MUX3 is controlled by the control signal cs_ir_select_s.

The delay element D1 is fed on the input side by the context identification value context_id_i and issues on the output side the context identification value cs_context_id_s.

The delay element D2 is fed by the useful data element data_i and issues on the output side the useful data element data_s, with which the delay element D3 is fed. The delay element D3 issues a useful data element data_o.

A clock signal clk_i feeds the context switching unit CS, the instruction fetch unit IF, the instruction decoding unit ID and the delay elements D1, D2 and D3.

The fundamental method of operation of the individual components of device 1 are described below.

The useful data elements data_i, whose processing is controlled by the device 1, originally come from different data sources and enter the device 1 in serial fashion. Input of useful data elements data_i into the device 1 is laid out so that no more than one useful data element data_i is available for processing in one clock cycle.

Each data source is assigned to a thread, each thread having its own context. The context switching unit CS is notified by the context identification value context_id_i, to which context the useful data element data_i being fetched for processing belongs.

The context switching unit CS contains a memory, in which the information concerning the context of each thread and the first instruction of each thread are entered. In addition, additional instructions are entered in the memory registers of each context, which can be accessed by a forced jump. By the context identification value context_id_i, the context and first instruction of the thread, to which the useful data element data_i refers, is activated in the context switching unit CS.

From the context switching unit CS, by means of the instruction set data element cs_ir_s, the instruction is transmitted to the instruction decoding unit ID, through which the processing step of the useful data element data_i being carried out is determined. In addition, the instruction decoding unit ID receives additional information through the state element cs_state_s that is entered in the corresponding registers of the context and refers to the actual state of the program prescribed for running.

In order for the instruction set data element cs_ir_s and the state element cs_state_s to reach the instruction decoding unit ID, multiplexer MUX2 must be in logic state 0. For this purpose, the control signal if_source_s must be deactivated.

The context identification value cx_context_id_s also enters the instruction decoding unit ID, which corresponds to the context identification value context_id_i, delayed by one clock cycle.

The instruction transmitted by the instruction set data element cs_ir_s is decoded by the instruction decoding unit ID. The control signal dec_o is issued as a result of decoding by the instruction decoding unit ID. The control signal dec_o represents an output signal of device 1 and serves to control a unit that is connected after device 1, and in which the instructions processed by device 1 are to be executed.

In addition, the control signal cs_store_s, the speculative count value id_spc_s, the state value id_state_s and the instruction set data element id_ir_s are transmitted by the instruction decoding unit ID to the context switching unit CS. For transmission of the instruction set data element id_ir_s, the multiplexer MUX3 must be switched to the logic state 0. For this purpose, the control signal cs_ir_select_s is deactivated by the instruction decoding unit ID.

By means of the control signal cs_store_s, the contact switching unit CS is notified that data has been conveyed by the instruction decoding unit ID or by the instruction fetching unit IF to the contact switching unit CS and are to be stored there.

The speculative count value id_spc_s is taken up further below.

The state value id_state_s contains information on the state, in which processing of the thread at the output of the instruction decoding unit ID is situated.

The instruction set data element id_ir_s contains information, in order to overwrite the registers that contain the instruction set of the presently activated thread.

The instruction decoding unit ID also generates the control signal if_source_s, with which the multiplexers MUX1 and MUX2 are controlled.

The instruction fetching unit IF obtains the speculative count value cs_spc_s and the context identification value cs_context_id_s, if the multiplexer MUX1 is in logic state 0. For this purpose, the control signal if_source_s must be deactivated.

The speculative count value cs_spc_s is taken up further below.

The instruction fetching unit IF contains a program memory. With reference to the speculative count value cs_spc_s and the context identification value cs_context_id_s, the instruction set is selected from the program memory, which is possibly required in the next clock cycle. This instruction set can be conveyed by means of the instruction set data element if_ir_s in the form of a machine code to the context switching unit CS and to the instruction decoding unit ID. To convey the instruction set data element if_ir_s to the context switching unit CS, the control signal cs_ir_select_s must be activated, so that the multiplexer MUX3 is in logic state 1.

In addition, the context identification value if_context_id_s is issued by the instruction fetching unit IF. The context identification value if_context_id_s corresponds to the context identification value cs_context_id_s, delayed by one clock cycle.

Cooperation of the individual components of device 1, and therefore the method of function device 1 are described in detail below.

The instruction structure underlying the instructions to be processed by device 1 reads:

$$\text{repeat X until Y else go to Z} \quad (1)$$

X stands for an instruction, Y for a condition and Z for a static target information. In the present practical example of the device according to the invention, an instruction set has the three aforementioned data. The instruction sets are transferred by the instruction set data elements cs_ir_s, id_ir_s and if_if_s.

The instruction set to be processed first in a thread is entered in the registers of the corresponding context in the context switching unit CS. The context is activated by means of the context identification value contex_id_i, and the instruction set entered in the registers is conveyed to the instruction decoding unit ID by means of the instruction set data element cs_ir_s. The instruction decoding unit ID decodes the instruction contained in the instruction set and generates the control signal dec_o from it.

Parallel with the procedure just described, the useful data element data_i passes through the delay elements D2 and D3, during which, in each of the two delay elements D2 and D3, it is delayed by one clock cycle. Since activation of the context, as well as decoding of the corresponding instruction, requires the duration of one clock cycle, it is ensured by delaying the data element in the delay elements D2 and D3 that the useful data element data_i, in the form of a time-delayed useful data element data_o, simultaneously reaches the downline component with the control signal dec_o, resulting from decoding of the corresponding instruction. In the downline component, processing of the useful data element data_o can then be carried out with reference to control signal dec_o.

During the clock cycle, in which the instruction set belonging to the activated context is conveyed to the instruction decoding unit ID, the speculative count value cs_spc_s is also transferred to the instruction fetching unit IF. The speculative count value cs_spc_s states that increment of the position of the instruction conveyed to the instruction decoding unit ID within the corresponding thread. If, for example, the first instruction of the thread is conveyed to the instruction decoding unit ID, the speculative count value cs_spc_s is equal to 2. By means of the speculative count value cs_spc_s and the context identification value cs_context_id_s, the instruction fetching unit determines in its program memory the instructions that correspond to the speculative count value cs_spc_s. In the aforementioned example, this would be the instruction set that contains the second instruction to be processed in the thread. By means of the instruction set data element if_ir_s, the determined instruction set can be sent to the context switching unit CS.

In order for the instruction set data if_ir_s to reach the context switching unit CS in the form of an instruction set data element wb_ir_s from the instruction fetching unit ID, the multiplexer MUX3 must be brought into the logic state 1 by activation of the control signal cs_ir_select_s.

Since the instruction structure of device 1 is based on a repetition loop according to the above instruction structure (1), it can happen that the instruction made available by the instruction set data element if_ir_s is not necessary, but that the previous instruction is carried out again. In this case, the instruction set determined by the instruction fetching unit IF is discarded.

During each repetition of instruction, the control signal dec_o is issued again by the instruction decoding unit ID. Repetition of an instruction is carried out, until the condition Y is met. Condition Y can be coupled to a wide variety of events.

During reperformance of an instruction, the control signal cs_ir_select_s is deactivated and the controls signal cs_store_s is activated. By deactivation of control signal cs_ir_select_s, the instruction set data element id_ir_s is passed through by the multiplexer MUX3 and reaches the context switching unit CS in the form an instruction set data element wb_ir_s. The instruction set data element wb_ir_s contains the already executed and still to be repeated instruction. The control signal cs_store_s indicates to the context switching CS that it is to store the instruction set data element id_ir_s.

To control a repetition loop, there are a variety of possibilities. For example, the interrupt condition Y of a repetition loop can be stipulated by fulfillment of the equation "count+0". The value count is then contained in the instruction set and states the number of repetitions to be carried out at the beginning of the repetition loop. During each passage of the instruction set through the instruction decoding unit ID, the value count is decremented. The instruction set updated by this is conveyed by means of the instruction set data element id_ir_s to the context switching unit CS and stored there, instead of the previous instruction set. As soon as the value count has reached the value 0, condition Y is fulfilled and the repetition loop is interrupted.

As an alternative to the aforementioned example, the condition Y can also be fulfilled by an external stipulation or by the input of a specific useful data element data_i or by the presence of a specific state of the program, which is reflected in the statement of the state value cs_state_s or id_state_s.

As soon as the condition Y is met, processing of the thread jumps to the target information Z. This is consequently a conditioned jump instruction. The target data Z always refers to instruction from the current thread.

The condition Y is checked in the instruction decoding unit ID. All control signals are also adjusted from there.

If the target Z concerns the subsequent instruction in the thread that is contained in the instruction set data if_ir_s, the control signal if_source_s is activated, so that the instruction set data element if_ir_s is conveyed directly to the instruction decoding unit ID by the instruction fetching unit IF via multiplexer MUX2, and the instruction contained in it can be decoded. Owing to the fact that the multiplexer MUX1 is in logic state 1, the speculative count value id_spc_s is transmitted to the instruction fetching unit IF. The speculative count value id_spc_s causes the instruction fetching unit IF to fetch the subsequent instruction in the subsequent clock cycle for the instruction just conveyed to the instruction decoding unit ID.

In addition, in this case, the control signals cs_ir_select_s and cs_store_s are activated, so that the instruction set stored in the registers of the corresponding context are overwritten with the instruction set fetched by the instruction set data element if_ir_s.

If the target Z states a target address, whose corresponding instruction is situated in the context switching unit CS, this instruction is fetched by means of the state value id_state_s from the context switching unit CS and transmitted, by means of the instruction set data element cs_ir_s to the instruction decoding unit ID. For this purpose, control signal if_source_s must be deactivated.

To summarize, an algorithm is given below, which runs in the instruction decoding unit ID, and from which it follows, by means of which criteria the control signal cs_ir_select_s, cs_store_s and if_source_s are adjusted:

If (subsequent instruction of the thread is required), then

```
        set cs_store_s to active
        set cs_ir_select_s to active
        if (cs_context_id_s ≠ if_context_id_s) then
            set if_source_s to inactive
        else
            set if_source_s to active
        end if
    else
        set if_source_s to inactive
``` if (instruction set registers are overwritten), then

```
        set cs_store_s to active
        set cs_ir_select_s to inactive
    else
        set cs_ir_select_s to don't care
        set cs_store_s to inactive
    end if
end if
```

In the aforementioned algorithm, it should be kept in mind that the condition "instruction set registers are overwritten" is also true, if an instruction entered in the context switching unit CS is required.

We claim:

1. A device for controlling processing of incoming data elements, wherein threads are assigned to the data elements, comprising:
    a first unit to fetch a first unit instruction for processing a first data element;
    a second unit to fetch a second unit instruction for processing the first data element, wherein the second unit instruction succeeds a stipulated instruction of a stipulated thread;
    a first multiplexer having a first input to receive the first unit instruction and a second input to receive the second unit instruction and a control signal input, said multiplexer being configured to produce a selected instruction selected from the first unit instruction and a second unit instruction based on the multiplexer control signal; and
    a third unit configured to receive the selected instruction, comprising:
        a decoder to decode the selected instruction;
        a condition evaluator to evaluate a condition associated with repetitive execution of the first unit instruction; and
        a control signal generator receiving outputs from said condition evaluator and configured to generate at least one control signal including the first multiplexer control signal based, at least in part, on said outputs.

2. The device according to claim 1, wherein the second unit instruction succeeds the stipulated instruction by one instruction.

3. The device according to claim 2, wherein the second unit is configured to receive an increment of a count value and an identification value, which designates a thread, and the second unit is configured to use the increment of the count value and the identification value to determine the second unit instruction.

4. The device according to claim 3, wherein the second unit is configured to determine the instruction that succeeds the instruction fetched by the first unit in the thread.

5. The device according to claim 1, wherein the first unit is configured to activate a new context that is associated with the first thread if the preceding thread and the first thread differ.

6. The device according to claim 5, wherein the first unit is configured to fetch, responsive to activating the new context, a first instruction of the first thread and transmit the first instruction to the third unit for decoding; and the first unit is configured to transmit an increment of the position that the instruction fetched by it assumes in the thread, to the second unit.

7. The device according to claim 1, wherein
the first unit instruction is repeated for successive data elements until the condition is fulfilled.

8. The device according to claim 7, wherein
the third unit is configured to cause repetition of the selected instruction by causing repetition of the first multiplexer control signal.

9. The device according to claim 8, wherein
the number of repetitions of the selected instruction is stipulated by a value;
the third unit is configured to decrement the value in conjunction with each repetition; and
the repetitions are interrupted when the value reaches zero.

10. The device according to claim 7, wherein
responsive to fulfillment of the condition, a stipulated instruction within a currently assigned thread is used for processing of a next succeeding data element if a thread assigned to the succeeding data element is the same as the currently assigned thread.

11. The device according to claim 10, wherein
the stipulated instruction is the second unit instruction fetched by the second unit.

12. The device according to claim 11, wherein
the second unit instruction is transmitted to the first unit and entered in a context therein.

13. The device according to claim 10, wherein
the stipulated instruction is fetched by the first unit and transmitted to the third unit for decoding.

14. The device according to claim 10, wherein
the third unit, after fulfillment of the condition, transmits information to the first unit indicative of which instruction is to be fetched.

15. The device according to claim 10, wherein
the condition comprises a condition selected from the group consisting of assertion of a signal controllable from outside of device, detection of a specific data element entering the device, detection of a specific state of the currently assigned thread, and detection of a specific instruction to be processed.

16. The device according to claim 7, further comprising:
a program memory including instructions for processing of the data elements and information corresponding to at least one instruction indicative of to how many data elements the instruction is to be applied.

17. The device according to claim 1, further comprising:
two series-connected delay units each configured to delay an incoming data element by one clock cycle.

18. A method for controlling processing of data elements, wherein the data elements are assigned to threads, the method comprising:
storing at least one instruction of a first thread assigned to a first data element in a first set of registers of a first unit;
fetching by the first unit a first unit instruction from said at least one instruction of said first thread;
fetching by a second unit a second unit instruction, which succeeds a stipulated instruction in a stipulated thread, and
outputting, by a first multiplexer receiving said first unit instruction and said second unit instruction, a selected instruction selected from the first and second unit instructions;
decoding said multiplexer output instruction by a third unit;
evaluating by the third unit a condition associated with repetitive execution of the first unit instruction; and
responsive to a control signal generator receiving outputs indicative of said evaluating, generating at least one control signal including the first multiplexer control signal based, at least in part, on said outputs.

19. The method according to claim 18, wherein
the second unit instruction immediately succeeds the stipulated instruction.

20. The method according to claim 19, further comprising:
receiving, by the second unit, an increment of a count value and an identification value, which designates a thread, and
determining, by the second unit, the second unit instruction using the increment of the count value and the identification value.

21. The method according to claim 20, further comprising:
determining an instruction that succeeds the instruction fetched by the first unit in the thread.

22. The method according to claim 18, further comprising:
activating, by the first unit, a context of the first thread if a preceding data element refers to another thread.

23. The method according to claim 22, further comprising:
responsive to activating the context, by the first unit, fetching a first instruction of first thread as the first unit instruction and transmitting the first unit instruction to the third unit for decoding; and
transmitting an increment of a position the first unit instruction assumes in the first thread to the second unit.

24. The method according to claim 18, further comprising:
decoding an instruction repetitively for successive data elements until a stipulated condition is met.

25. The method according to claim 24, wherein
repetitively decoding the instruction is accomplished by the generating the same first multiplexer control signal by the third unit.

26. The method according to claim 24, wherein
the number of repetitions of an instruction is stipulated by a value,
the value, during a repetition of the instruction, is decremented by the third unit, and
the repetitions are interrupted by the value 0.

27. The method according to claim 24, wherein
after fulfillment of the stipulated condition a stipulated instruction within a currently assigned thread is used for a successive data element if the currently assigned thread is also assigned to the successive data element.

28. The method according to claim 27, wherein
an inquiry into fulfillment of the stipulated condition occurs in the third unit.

29. The method according to claim 28, wherein
the second unit instruction is transmitted to the first unit and stored in a context of the first unit.

30. The method according to claim 27, wherein
the stipulated instruction is the second unit instruction.

31. The method according to claim 28, further comprising:
   after fulfillment of the stipulated condition, transmitting an instruction by the third unit to the first unit as to which instruction is to be fetched.

32. The method according to claim 27, wherein
   the stipulated instruction is fetched by the first unit and transmitted to the third unit for decoding.

33. The method according to claim 27, wherein
   the stipulated condition, whose fulfillment leads to interruption of repetitions of an instruction, is fulfilled by a signal controllable from outside of device, or by a specific data element entering the device, or by a specific state of the corresponding thread, or by a specific instruction to be processed.

* * * * *